May 12, 1970  J. R. PALMA  3,511,407
VALVE FOR CONTAINERS

Filed March 22, 1968  3 Sheets-Sheet 1

INVENTOR.
JAMES R. PALMA.
BY
John H. Oltman

May 12, 1970 J. R. PALMA 3,511,407
VALVE FOR CONTAINERS

Filed March 22, 1968 3 Sheets-Sheet 2

INVENTOR.
JAMES R. PALMA.
BY
John H. Oltman

May 12, 1970   J. R. PALMA   3,511,407
VALVE FOR CONTAINERS
Filed March 22, 1968   3 Sheets-Sheet 3

INVENTOR.
JAMES R. PALMA.
BY
John H. Oltman

United States Patent Office 3,511,407
Patented May 12, 1970

3,511,407
VALVE FOR CONTAINERS
James R. Palma, 1502 Curry Road,
Schenectady, N.Y. 12306
Filed Mar. 22, 1968, Ser. No. 715,379
Int. Cl. B65d 51/16
U.S. Cl. 220—44     4 Claims

ABSTRACT OF THE DISCLOSURE

A valve for use with a container having an opening therein, the valve including a closure for closing the container opening, a passageway through the closure smaller than the opening, and a yieldable flap connected to the closure for sealing off the passageway. The flap prevents flow of fluid in one direction through the passageway, but yields to allow flow of fluid in the other direction through the passageway. The closure may be a plug or a cap, and in either case it is shaped to fit the container opening to seal the opening except for the passageway. The flap is resiliently flexible and has a continuous edge which is biased against a surface of the container or against a surface of the closure itself, thereby sealing off the passageway. The closure may be reversible so that the flap can be positioned either inside or outside of the container to determine the direction in which fluid can flow through the passageway. The valve can be used to equalize pressure in a nursing bottle, or may be used with other containers as will be described.

BACKGROUND OF THE INVENTION

One application of the invention is in connection with nursing bottles. It is well known that with the ordinary nursing bottle and nipple, when the baby sucks on the nipple and takes formula from the bottle, pressure inside the bottle is reduced causing the nipple to collapse, thus hindering or preventing further flow. The nipple must be removed from the baby's mouth to allow air to enter the bottle through the nipple and thereby equalize pressure. Various devices have been proposed to allow such equalization of pressure without removing the nipple from the baby's mouth, but they have not been entirely satisfactory.

Similar problems exist with containers other than nursing bottles. For example, when a bottle containing carbonated liquid has been opened and the liquid has been partially used, it is sometimes desirable to recap the bottle and place it in the refrigerator. When the liquid is cooling in the refrigerator, pressure in the bottle is reduced and gas is released from the liquid, thus reducing the carbonation. It would be more desirable to have a cap which would equalize pressure in the bottle with ambient pressure during cooling to minimize escape of gas from the liquid.

Another problem arises in the canning or packing of foods. If hot food is provided in a canning bottle, and a closure is attached to seal the bottle, when the food cools, pressure in the bottle is reduced providing a vacuum pack. Sometimes, however, the seal leaks releasing the vacuum, and the food may then spoil. There is no way to tell whether there is or is not a good seal. It would be desirable to have a device which would indicate whether or not the closure is sealed.

SUMMARY OF THE INVENTION

The present invention provides a valve including a closure, a passageway through the closure, and a flap affixed to the closure for sealing off the passageway but being yieldable to allow flow of fluid in one direction through the passageway. The valve can be used in any of the applications discussed above in connection with the background of the invention. When the closure is applied so that the flap is inside the container, fluid cannot leave the container through the passageway, but if pressure inside the container is reduced, the flap will yield to allow air to enter the container through the passageway. On the other hand, if the closure is applied with the flap outside the container, fluid cannot enter the container, but if pressure is increased in the container it can escape through the passageway since the flap yields to such pressure.

The closure may comprise a plug or a cap, the plug being designed to fit in an opening in the container, and the cap being designed to fit the mouth of a container about the opening. The flap is designed to bear against the surface of a container or a surface of the closure, and in either case the flap seals off the passageway through the closure. Where the flap is to engage the container, the flap and closure may be molded in one piece from plastic. Where the flap is to engage the closure, the flap and closure are separate pieces, and the flap is adjusted relatively to the closure to cause an edge of the flap to be resiliently biased against the closure.

As applied to a nursing bottle, the valve covers an opening in the bottle separate from the mouth thereof, and the flap faces the inside of the bottle. When pressure in the bottle is reduced, the flap yields to allow air to enter the bottle through the passageway in the closure.

As applied to a container of carbonated liquid, the valve is placed at the mouth of the container with the flap facing the inside of the container. When pressure in the container is reduced, say as the liquid cools, the flap allows air to enter the container through the passageway, thus equalizing pressure.

The valve may also be used in the canning of foods. The closure may be applied to the mouth of the container with the flap facing toward the outside of the container. When the container is heated for cooking, air is released through the valve. Then, when the container and contents are allowed to cool, the flap seals the passageway of the closure so that air cannot enter the container, and a vacuum pack is achieved. In this connection, the flap is flattened when a vacuum is present, thus indicating whether or not a good seal has been achieved and/or maintained.

Accordingly, it is an object of the present invention to provide an improved valve device for controlling flow of fluid into or out of a container.

Another object of the invention is to provide a one way valve which can be applied to an opening in a container, and which will seal the opening but yet allow gas to flow in one direction through the valve if a pressure differential in that direction exists.

Another object of the invention is to provide a one way valve for containers which can be fabricated economically on a mass production basis.

Other objects of this invention will appear in the following description and appended claims, reference being had to the accompanying drawings forming a part of this specification wherein like reference characters designate corresponding parts in the several views.

Figure 1:
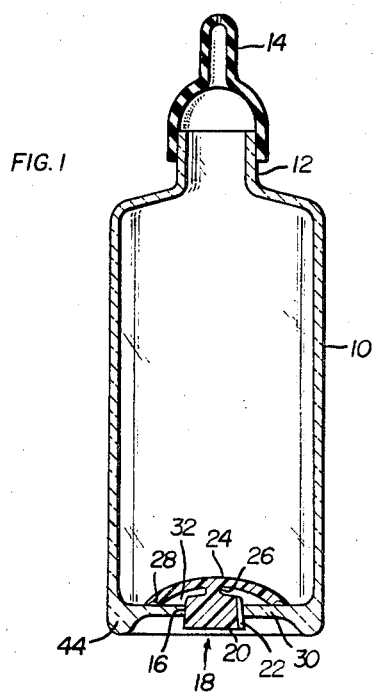
FIG. 1 is a longitudinal sectional view of a nursing bottle provided with a valve in accordance with one embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to FIGS. 1–4, a nursing bottle 10 has a neck 12 to which a conventional rubber nipple 14 is affixed so that a baby can take formula from the bottle by sucking on the nipple. It will be understood that the nipple 14 may be of the type having a flange which is clamped to the bottle by means of a clamping ring, if desired.

An opening 16 is provided in the bottom of the bottle, and this opening is ordinarily circular in configuration. A valve, designated generally as 18, is provided in opening 16, and the valve 18 may be of rubber, plastic or other suitable resilient material.

Valve 18 includes a circular plug portion 20 which fits snugly in opening 16 to plug that opening except for a small passageway formed by a channel 22 extending up one side of the plug portion 16 and leading from the outside to the inside of the bottle.

The valve 18 also includes a flap 24 which is affixed to the inner end of plug 20, and which in this embodiment is integral with plug 20. There is a reduced neck 26 between plug 20 and flap 24. Flap 24 extends transversely relative to plug 20 and has a dished configuration so that flap portion 24 curves back toward plug 20. Flap 24 has a circular edge 28 which extends about plug 20. When valve 18 is inserted in opening 16 so that plug 20 closes the opening except for passageway 22, the circular edge 28 of flap 24 bears against the inside surface of the bottom wall 30 of container 10, thus forming a sealed space 32 underneath flap 24.

Figure 2:
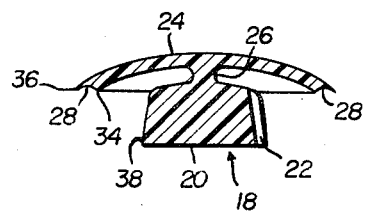
FIG. 2 is an enlarged sectional view of the valve of FIG. 1.

Flap 24 is resilient and flexes slightly when the valve is in place as in FIG. 1 so that circular edge 28 is resiliently biased against bottom wall 30 so that edge 28 forms a seal. Edge 28 may be recessed slightly as shown in FIG. 2 to form two tips 34 and 36 which contact the bottom wall 30 and give slightly to assure that edge 28 forms a seal. The side 38 of plug portion 20 may be tapered inwardly slightly from the bottom to the top thereof so that when the valve is inserted into opening 16, plug portion 20 will enter the opening just far enough to assure that edge 28 is resiliently urged against the bottom wall 30 of bottle 10.

Figure 3:
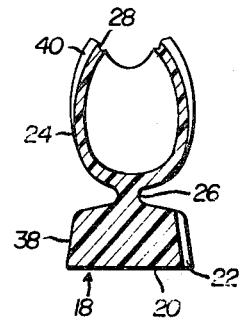
FIG. 3 is a sectional view similar to FIG. 2, but showing a flap portion of the valve folded to facilitate insertion thereof through an opening in the bottle of FIG. 1.

FIG. 3 illustrates the manner in which flap portion 24 may be folded upwardly and inwardly forming folds 40 to reduce the area of the flap so that it can be inserted through the opening 16. Once inside the opening, the flap 24 will unfold and urge its edge 28 against the bottom of the bottle.

Referring to FIG. 1, if the bottle 10 is filled with liquid such as baby formula, the liquid cannot escape through opening 16 because the opening is blocked by the flap portion 24. Since the edge 28 is urged against bottom wall 30, a seal is formed where edge 28 contacts wall 30, and liquid will not escape under edge 28.

Figure 4:
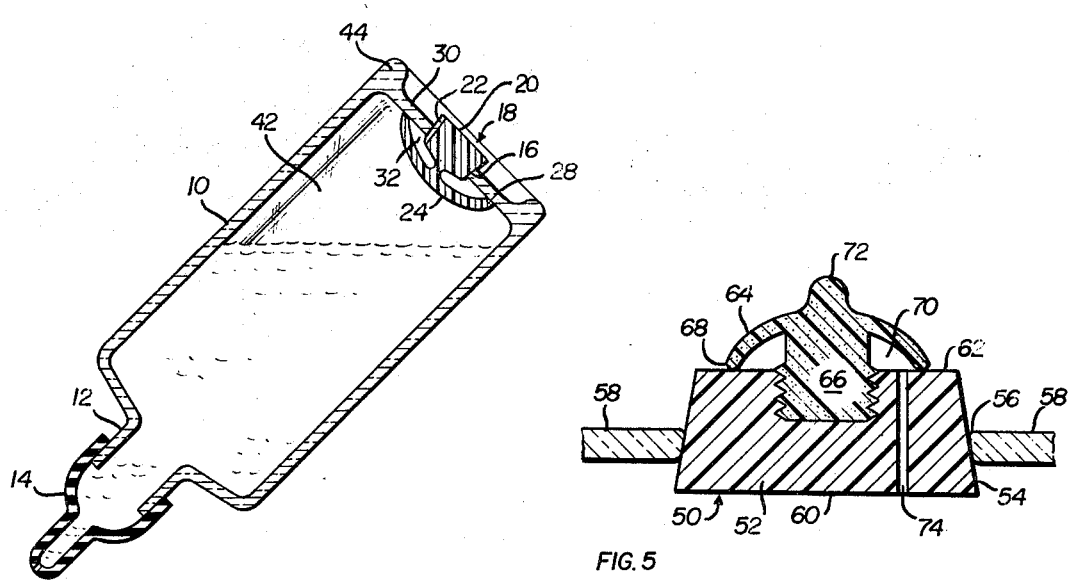
FIG. 4 is a sectional view showing the bottle in an inverted position as it might be held during nursing.

When the bottle 10 is in use for nursing, it is ordinarily in an inverted position as shown in FIG. 4. As the baby sucks on nipple 14, thus taking liquid from the bottle, pressure is reduced in the space 42 above the liquid. A pressure differential then exists on opposite sides of flap portion 24. Because of this pressure differential, edge 28 yields and allows air to escape from space 32 around edge 28 and into space 42. This equalizes the pressure inside the bottle 10 with ambient pressure outside the bottle. Thus, reduced pressure is not allowed to build up inside the bottle, and the nipple 14 will not be held in a collapsed condition. It is not necessary to remove the nipple from the baby's mouth to allow the nipple to expand as is the case where no pressure equalizing device is provided.

As shown in FIGS. 1 and 4, the bottle 10 may be provided with a circular projection 44 with the bottom wall 30 being recessed from this projection so that the valve 18 will not project beyond the bottom surface of the bottle on which it is seated when not in use.

Figure 5:
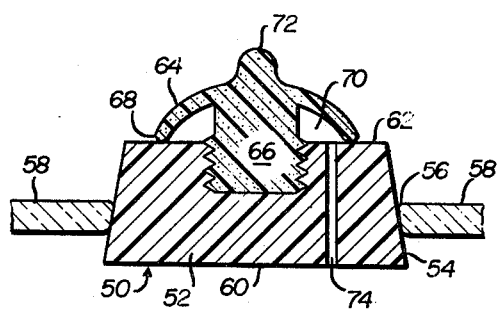
FIG. 5 is an enlarged sectional view of a two-piece valve in accordance with another embodiment of the invention, the valve being applied to an opening in the bottle of a nursing bottle as in FIGS. 1–4.

FIG. 5 illustrates another embodiment of the valve. The valve 50 in FIG. 5 consists of a resilient plug member 52 having a generally cylindrical shape, but ordinarily having a slightly tapered side surface 54 to facilitate insertion of the plug 52 in an opening 56 in the wall 58 of a container. Surface 60 of plug 52 is outside the container, and surface 62 of the plug is inside the container. A separate flap member 64 is affixed to the inner end of plug 52, and this may be accomplished by providing a shank 66 on the flap member which screws into a recess in the plug member 52 as shown in FIG. 5. The flap member 64 is dished as shown so that its circular edge 68 extends from the top of shank 66 back toward plug 52. Flap member 54 is resiliently flexible. The shank portion 66 is screwed into plug 52 far enough so that edge 68 contacts surface 62 and flap 64 is flexed slightly so that edge 68 is resiliently urged against the plug. Thus, flap 64 forms a sealed space 70 underneath the flap. Flap 64 may be provided with a thin projection 72 which may be grasped with the fingers to facilitate screwing the flap member into the plug 52.

Plug 52 has a passageway 74 extending through it, and this passageway communicates with the sealed space 70. It may be considered that wall 58 is part of a nursing bottle such as the bottle 10 of FIGS. 1–4. When liquid is provided in such a bottle, it will not leak through opening 56 because plug 52 closes that opening. The liquid cannot leak through passageway 74 because the flap 64 forms a seal about the passageway. When pressure is reduced inside the bottle, a pressure differential exists on opposite sides of flap 64, and this causes the edge 68 to yield slightly, the edge 68 being displaced away from surface 62, so that air can escape from space 70 around edge 68 into the bottle. This equalizes pressure inside the bottle with the ambient pressure outside the bottle.

Figure 6:
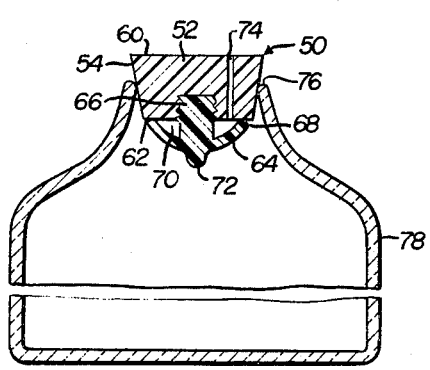
FIG. 6 is a sectional view showing the valve of FIG. 5 applied to the mouth of an ordinary bottle.

FIG. 6 illustrates the valve 50 as applied to the mouth 76 of a bottle 78. The valve 50 of FIG. 6 is identical to the valve 50 of FIG. 5, and therefore the description of the valve will not be repeated. In use, the valve 50 in FIG. 6 prevents fluid (either liquid or gas or both) from leaving the container 78, but allows air to enter the container through passageway 74 when pressure in the container 78 is reduced.

The container 78 may contain a carbonated liquid such as a soft drink. In this case, assume that the original cap for the container has been removed, and some of the liquid has been poured out of the container. Assume that the liquid in the container is at room temperature. The valve 50 may then be inserted in the opening of the container within mouth 76 so that the plug member 52 plugs the opening and flap 64 is inside the opening and seals off the passageway 74. If the container is then placed in a refrigerator to cool, the pressure inside the container tends to be reduced as cooling takes place. However, the flap 64 yields to the greater ambient pressure outside the container, and allows air to enter the container through passageway 74 and around edge 68 of flap 64. Thus, the pressure inside the container is never reduced sufficiently to cause gas to escape from the carbonated liquid therein, and the carbonation is not lost.

Figure 7:
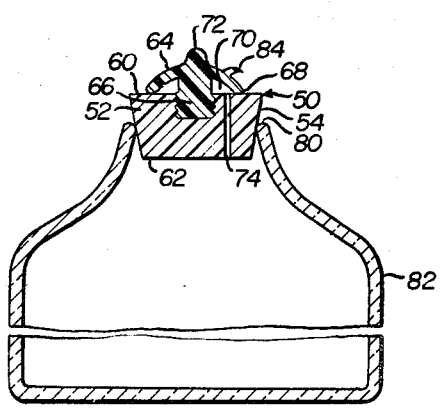
FIG. 7 is a sectional view showing a slight modification of the valve of FIGS. 5 and 6 allowing the valve to be inserted into the mouth of a bottle with a flap of the valve outside the bottle.

FIG. 7 shows a valve 50 in the mouth 80 of bottle 82. Valve 50 is identical to the valve of FIGS. 5 and 6 except that the flap 64 is affixed to end 60 of plug 52 rather than to the smaller end 62. This is done by screwing the threaded shank 66 of flap 64 into a threaded recess provided in end 60 of plug 52.

In the use of the valve 50 of FIG. 7, the valve is inserted in the opening inside mouth 80 with the flap 64 located outside the opening. Assume that the bottle 82 contains a food which is to be preserved. Bottle 82 and its contents may be heated for cooking the contents, and as the air inside the container expands, excess pressure will escape from the bottle through passageway 74 and under the edge 68 of flap 64. Flap 64 yields to allow the air to escape. If the container and its contents are then allowed to cool, air pressure inside the container will be reduced. Air cannot enter the container because the greater atmospheric pressure outside the container tends to urge flap 64 against surface 60 of plug 52. Thus, a vacuum builds up inside the container providing a vacuum pack.

When vacuum exists inside the container 82, flap 64 tends to be flattened, and this provides an indication that there is vacumm inside the container. Therefore, it is possible to tell whether there has been a chance for spoilage of the food in the container. The vacuum in the container can easily be released by merely lifting the flap 64. A small projection 84 can be provided on flap 64 extending away from the plug 52, and the projection 84 may be pulled to break the seal formed by flap 64. The valve 50 can then be removed from container 82 more easily.

Figure 8:
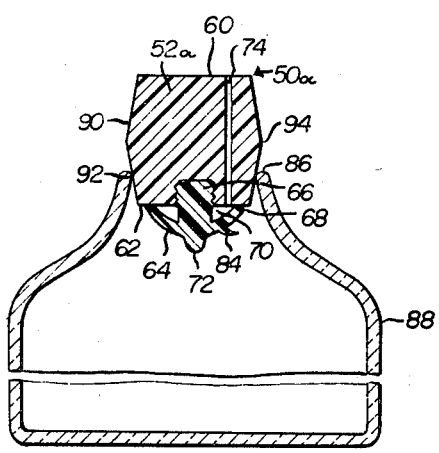
FIG. 8 shows another modification of the valve of FIG. 5 wherein a double taper is provided on a plug portion of the valve.

FIG. 8 shows a valve 50a provided in the mouth 86 of a container 88. Valve 50a is identical to valve 50 of FIGS. 5 and 6 except that the plug 52a has two tapered side surfaces 90 and 92 instead of the single tapered side surface 52 as shown in FIG. 5. Flap 64 of FIG. 8 is identical to flap 64 of FIGS. 5 and 6. Side surface 90 tapers outwardly from end surface 60 of plug 52a to an enlarged portion 94 of the plug which is larger than the opening within mouth 86 of container 88. Similarly, side surface 92 tapers outwardly from end surface 62 of plug 62a to the enlarged portion 94.

The valve 50a will serve multiple functions. It may be inserted into container 88 with flap 64 inside the container as shown in FIG. 8 to serve as a pressure equalizing device as described above in connection with FIGS. 5 and 6. In this application, air is allowed to enter the container through passageway 74 when pressure is reduced in the container. The valve will prevent fluid from leaving the container.

Figure 9:
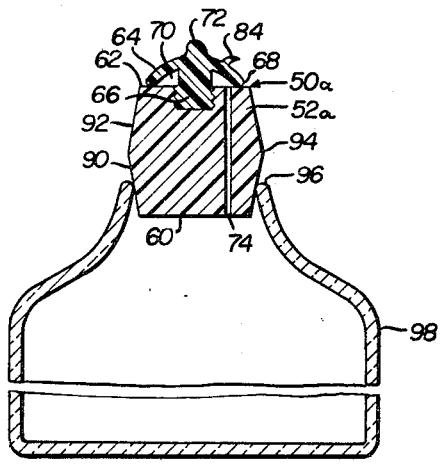
FIG. 9 is a sectional view showing the valve of FIG. 8 in an inverted position.
Figure 11:
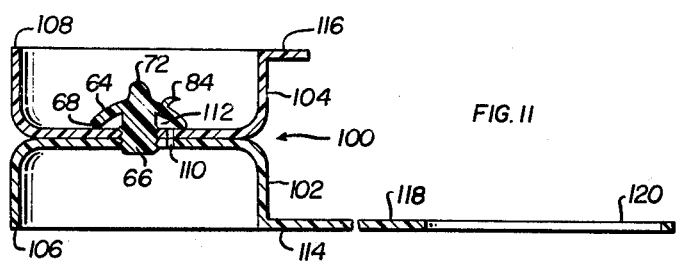
FIG. 11 is a sectional view taken on line 11—11 of FIG. 10.
Figure 10:
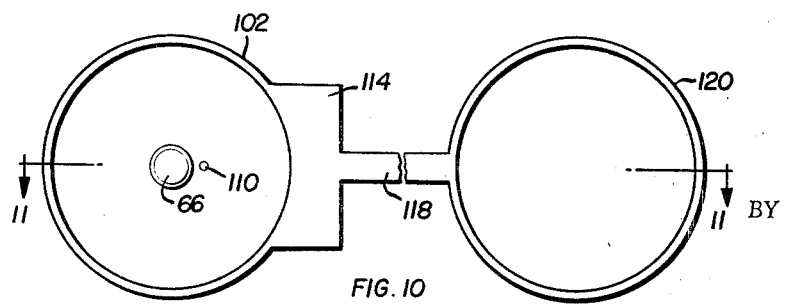
FIG. 10 shows a bottom plan view of a valve in accordance with another embodiment of the invention wherein the closure portion of the valve is a cap, and in this case, a reversible cap.

The valve 50a can also be used to provide a vacuum pack in the manner discussed in connection with FIG. 7, and in this case valve 50a is inserted into the mouth 96 of a container 98 with the flap 64 outside the container. Tapered surface 90 bears against mouth 96 in this case. This arrangement is shown in FIG. 9. Valve 50a in FIG. 9 will prevent air from entering the container, and will hold a vacuum produced in the container.

FIGS. 10, 11, 12 and 13 illustrate another embodiment of the invention. In this embodiment, a flap member 64 which is identical to that described previously is used in connection with a cap 100 composed of two individual cap members 102 and 104, with either of the caps 102 and 104 serving as a closure. Caps 102 and 104 are affixed together in back-to-back relation so that the lips 106 and 108 of the caps project in opposite directions. The shank portions 66 of flap 64 is threaded and screwed into a threaded opening which extends through both of the cap members 102 and 104. Shank 66 is screwed in far enough so that edge 68 of flap 64 bears against a surface of one of the caps, in this case cap 104, and also far enough to flex cap 64 slightly so that edge 68 is biased against the cap. A passageway 110 extends through both caps and communicates with the sealed space 112 under flap 64.

Both of the caps 102 and 104 are provided with integral handles 114 and 116 to facilitate lifting the cap off the mouth of a container. Handle 114 is provided with an integral extension 118 having an integral ring 120 at the end thereof.

Figure 12:
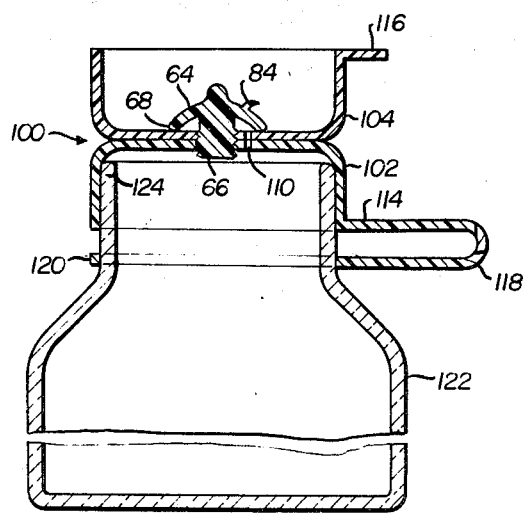
FIG. 12 is a sectional view showing the valve of FIGS. 10 and 11 applied to the mouth of a bottle.
Figure 13:
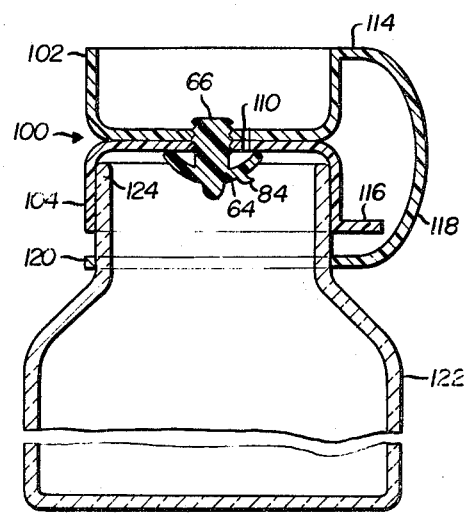
FIG. 13 is a view similar to FIG. 12, but showing the valve in an inverted position.

FIGS. 12 and 13 illustrate the manner in which the valve 100 may be applied to a container 122 having a mouth 124. In FIG. 12, cap 102 is fitted on the mouth 124 of the container to close the mouth of the container. Flap 64 is located outside the container. With this arrangement, the valve 100 may serve the same purpose as the valve 50 of FIG. 7. That is it may be utilized in canning foods to hold a vacuum produced inside the container 122.

In FIG. 13, cap 104 is applied to the mouth 124 of container 122 and the flap 64 is inside the mouth of the container. With this arrangement, the valve 100 serves the same purpose as the valve 50 of FIG. 6. That is, the valve will allow air to enter the container 122 if pressure is reduced therein, but will not allow gas or liquid to escape from the container. Thus, the valve 100 arranged as in FIG. 13 can be applied to a bottle containing carbonated liquid for the purpose of equalizing pressure in the bottle with atmospheric pressure as the bottle and its contents are cooled.

In both FIG. 12 and FIG. 13, the ring 120 encircles the neck portion of the bottle 122 and serves merely as an anchor to hold the valve on the container after the valve has been removed from the top of the container. Obviously, the extension 118 bends to allow both the ring 120 and the cap 102 or 104 to be applied to the bottle.

Figure 14:
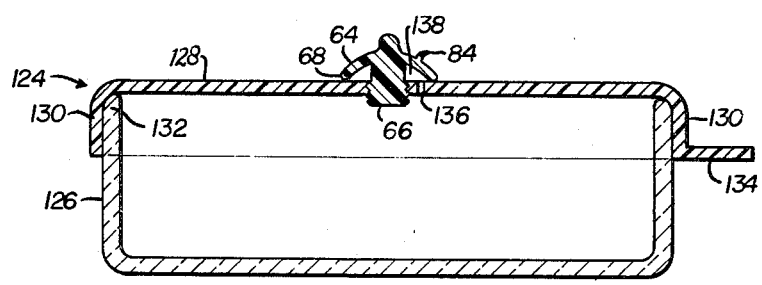
FIG. 14 is a sectional view showing a valve applied to the mouth of a bottle wherein the closure portion of the valve is a single cap.

FIG. 14 illustrates a valve 124 applied to a large mouth bottle 126. Valve 124 includes a single cap 128 having a downwardly extending lip 130 which fits over the mouth 132 of bottle 126. Lip 130 has a handle 134 integral therewith to facilitate removing the cap 128 from the bottle. Flap 64 is identical to the flaps described previously, and its threaded shank 66 screws into a recess or opening formed in cap 128 far enough so that edge 68 contacts cap 128 and flap 64 flexes to bias edge 68 against the cap. A passageway 136 extends through cap 128 and communicates with the sealed space 138 under flap 64. Valve 124 as applied to a large mouth container 126 as shown in FIG. 14 may be used in the preservation of foods to form a vacuum pack as described above in connection with FIG. 7.

Figure 15:
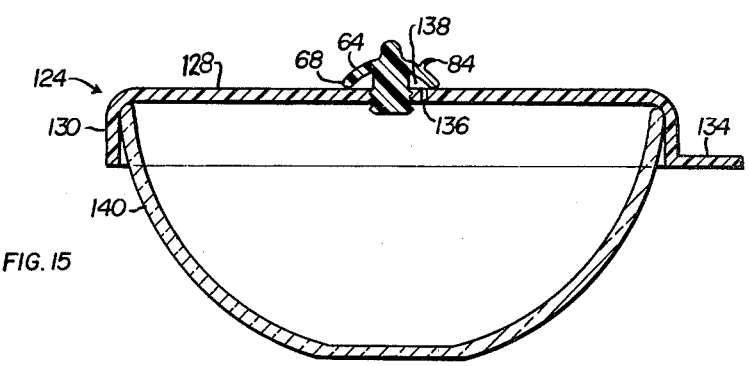
FIG. 15 shows the valve of FIG. 14 as applied to a bowl.

In FIG. 15, the same valve 124 as shown in FIG. 14 is applied to a dish 140 which may be made of glass or plastic by way of example. Cap 128 may be made of soft plastic. With cap 128 applied to dish 140 as shown in FIG. 15, cap 128 may be depressed slightly by pushing down on it with the fingers, and air will escape from the inside of the container through passageway 136 and out under the edge 68 of flap 64. When cap 128 is released, it will rise slightly, thus reducing the pressure in the container 140. Flap 64 will remain sealed to cap 128 to hold this reduced pressure in the container. This manipulation of cap 128 is facilitated where the dish 140 is made of somewhat flexible plastic.

Figure 16:
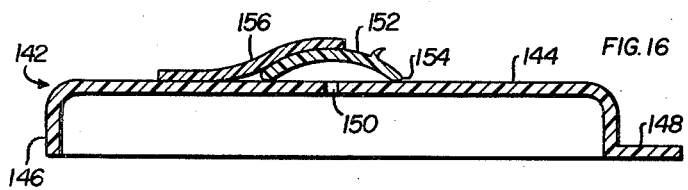
FIG. 16 shows a valve similar to FIGS. 14 and 15, but with the flap connected to the cap by a resilient arm.

FIG. 16 shows a valve 142 including a cap 144 having a downwardly projecting lip 146 with a handle 148 on one side thereof. A passageway 150 extends through cap 144. A flap 152 covers passageway 150 and has a circular edge 154 which bears against the top surface of cap 144. Flap 152 is dished and has the same configuration as flap 64 as described previously. However, flap 152 has no shank portion. Instead, it is urged against cap 144 by a resilient arm 156 connected at one end to flap 152, and connected at the other end to cap 144. Arm 156 may be connected to flap 152 and cap 144 by adhesive, or it may be molded integral with at least one of these members. Arm 156 is bent slightly, and is sufficiently resilient to urge flap 152 against cap 144 so that edge 154 forms a seal around passageway 150, thus sealing off the passageway. Valve 142 may be used in the same applications as valve 124 of FIGS. 14 and 15.

The entire valve may be made of plastic or rubber material in each of the embodiments described above, plastic material being indicated in the drawings. The valve 18 of FIGS. 1–4 may be molded in one piece, whereas the valves of the remaining figures are molded in at least two pieces. All of the embodiments can be fabricated economically. The valve may be used for pressure equalization, or as a means of holding reduced pressure in a container as described above. The valve is easy to manufacture and also to use.

Having thus described my invention, I claim:

1. A valve for use with a container having an opening therein, said valve comprising a closure for closing said opening of said container, means forming a passageway through said closure substantially smaller than said opening, and a yieldable flap connected to said closure for sealing off said passageway to prevent flow of fluid in one direction through said passageway but, by yielding, to allow flow of fluid in the other direction through said passageway, said flap and said closure comprising separate pieces, and said flap having a continuous edge yieldably biased against a surface of said closure about said passageway to seal off said passageway, said flap also having an attachment portion affixed to said closure to draw said edge against said closure for biasing the same against said surface, said closure having reversible back-to-back portions each adapted to be affixed over said opening to position said flap inside said opening when one of said back-to-back portions is affixed over said opening and outside said opening when the other such portion is affixed over said opening.

2. A valve as claimed in claim 1 in which said closure comprises a plug which has opposite ends with said flap connected to one of said ends, and said plug tapers outwardly from each end thereof to an enlarged portion larger than said opening, so that said plug may be placed in said opening with said flap inside or outside of said opening to determine the direction in which fluid may flow through said valve relative to said container.

3. A valve as claimed in claim 1 in which said closure comprises a pair of caps affixed together in back-to back relation with each of said caps fitting a mouth of said container about said opening, said passageway extending through both of said caps, and said flap edge bearing against a surface of one of said caps about said passageway, whereby either of said caps may be applied to said container mouth to position said flap inside or outside of said opening to determine the direction in which fluid may flow through said valve relative to said container.

4. A valve for use with a container having an opening therein, said valve comprising a closure for closing said opening of said container, means forming a passageway through said closure substantially smaller than said opening, and a yieldable flap connected to said closure for sealing off said passageway to prevent flow of fluid in one direction through said passageway but, by yielding, to allow flow of fluid in the other direction through said passageway, said flap and said closure comprising separate pieces, said flap having a continuous edge yieldably biased against a surface of said closure about said passageway to seal off said passageway, said flap also having an attachment portion affixed to said closure to draw said edge against said closure for biasing the same against said surface, and said closure comprising a plug having a size and cross-sectional configuration related to that of said opening in said container so that said plug may be inserted in said opening to close the opening.

References Cited

UNITED STATES PATENTS

| | | |
|---|---|---|
| 2,224,296 | 12/1940 | Hoffman. |
| 2,979,078 | 4/1961 | Witz _____ 215—11.4 XR |
| 3,292,808 | 12/1966 | Greene _____ 215—11.4 |
| 3,401,850 | 9/1968 | Anderson _____ 220—44 XR |
| 3,405,838 | 10/1968 | Preisendanz _____ 220—44 |

GEORGE T. HALL, Primary Examiner

U.S. Cl. X.R.

215—11.4, 56; 137—533.29